United States Patent Office 3,556,831
Patented Jan. 19, 1971

3,556,831
METHOD FOR SEALING LEAKS IN PRESSURIZED VESSELS
Rainer Schinabeck, 5 Gottschalkstr., 82 Munich 8, Germany, and Horst Hasse, Munich, Germany; said Horst assignor to said Schinabeck
No Drawing. Continuation-in-part of application Ser. No. 555,663, June 7, 1966. This application Sept. 16, 1969, Ser. No. 858,517
Int. Cl. B23p 7/04; B32b 35/00
U.S. Cl. 117—2                                    10 Claims

ABSTRACT OF THE DISCLOSURE

A method for sealing leaks in a rigid, hollow article, such as containers and conduits, preferably made of metal, which comprises the addition of two layers of epoxy resins over the leak to be sealed. The initial layer comprises an epoxy resin composition with a curing agent. This initial layer cures over a relatively fast period of time (within 1 to 5 minutes). Over this layer is added a second layer which may be the same or different epoxy resin together with a curing agent wherein a cure is achieved over a period of from one to five hours.

The two layers may each contain a variety of inert solid additives such as thixotropic agents, fillers, colorants, reinforcements, etc. The method is particularly useful for the sealing of conduits and/or containers which are under great pressure without the necessity of reducing the pressure or removing the medium within the container and/or conduit.

BRIEF SUMMARY OF THE INVENTION

This application is a continuation-in-part application of our copending aplication Ser. No. 555,663, filed June 7, 1966, and now abandoned.

The invention relates to the reconstruction of pipes and other rigid, hollow articles and/or surfaces and, more particularly, to a procedure whereby damaged or otherwise imperfect pipes may be satisfactorily repaired and, in effect, rebuilt. The procedures described herein may be applicable in many cases to a variety of hollow articles, especially metal articles, but novel and especially unusual advantages are realized in the arrangements and methods of the invention with respect to pipes, the latter term being used to signify pipes of all sorts, tubing and a variety of hollow conduits and ducts having the general characteristics of a pipe.

BACKGROUND OF THE INVENTION

Until recently, when damage or other imperfection occurred in some part of a pipe installation, there was no simple and satisfactory method available for the rapid repair, of even a temporary character, short of replacing the damaged lengths or piece of pipe or short of a welding or like operation. Previously, various cams or like attachments for engagement with the pipe have been used in order to enclose or box in the locality of the hole, break or other defect. However, these appliances proved to be cumbersome and difficult to apply. It is also exceedingly difficult and not often practicable to keep a supply of various sizes of repair attachments on hand, especially in circumstances which storage and transportation involve a special problem. For example, in naval and other marine vessels, where installations of pipe and piping are often quite extensive, it was not feasible to carry spare pipe lengths and fittings, or even repair attachments, sufficient to handle all anticipated difficulties. At the same time, it was also seldom convenient, or even possible, to perform any kind of welding job, especially in as expeditious a manner as might be required, for instance, to take care of battle damage and pipe or tubing in a naval vessel. Likewise, there were also a great many other situations of pipe installations, e.g., in industrial plants or other pipe installations at remote localities, where rapid repair of pipe damage or failure was often extremely desirable and yet it was not possible to perform such a repair in an easy or even feasible manner.

One problem, however, still remains with regard to the use of various plastic resins. Up to now, it has always been necessary to interrupt the flow of a fluid through the pipe or remove a fluid from a container, during the repair operation. This did not permit the prompt re-use of rigid, hollow articles, such as containers and/or conduits. Moreover, the sealing of a local fluid permeable discontinuity was especially difficult since it was necessary to clean and dry the area around the leak before any repair work could be commenced. Thus, there has been a great need for an efficient process for applying a hard, tough and highly flexible resinous material to water wetted surfaces, preferably metal surfaces where the material provides protection against corrosion and/or repair defects so as to render the surface water tight.

There has also been a great need in industry for a superior process for repairing other types of surfaces while wet and/or submerged under water whereby the defects could be repaired. This includes, for example, repair of boat hulls while the boat is still in the water, repair of water-wetted surfaces of pressure vessels, heat exchange tubes, containers, or any other rigid, hollow article.

OBJECTS OF THE INVENTION

It has been discovered that leaks of the type discussed hereinbefore, can be effectively repaired by the successive application of two epoxy resin compositions containing different curing agents over the local fluid permeable discontinuity, or leak. The first layer of epoxy resin to be applied cures rapidly and, after this layer has hardened, a second layer is then applied over the first layer, as well as the area around the leak. This second layer cures more slowly than the first epoxy resin composition.

It is a primary object of this invention, therefore, to provide a method for the quick and efficient repair and construction of rigid, hollow articles, such as containers, pipes and the like, which contain a local fluid permeable discontinuity, or leak.

An important further object of the present invention is to provide a method for sealing local fluid permeable discontinuities, or leaks, without the necessity of having to interrupt the flow of a fluid through the pipe or removing a fluid from a container during the repair operation.

It is also an object of this invention to provide a new method for sealing local fluid permeable discontinuities or leaks in containers and/or conduits wherein the repaired article can be promptly restored to service and needs no further attention over a long or even indefinite period of time.

A still further object is to provide a new process for treating wet and/or submerged surfaces and to repair defects therein. In this regard, it is still another object of this invention to provide a new process for applying a coating which is hard and tough over the local fluid permeable discontinuity, as well as to provide an economical and highly efficient process for achieving this and all of the objects set forth herein.

These and other objects of the present invention will become more apparent during the course of the following detailed description and appended claims.

DETAILED DESCRIPTION OF THE INVENTION

It has now been discovered that these and other objects may be accomplished by the process of the invention which first comprises the step of applying to a local fluid permeable discontinuity a first epoxide resin coating composition comprising an epoxy resin having an epoxide equivalent of from about 170 to about 250. This epoxy mixture is capable of curing rapidly. Thereafter, a second epoxy resin composition is applied over the first coating. This epoxy resin composition also comprises an epoxy resin having an epoxide equivalent of from about 170 to about 250 and a curing agent. The second epoxy resin composition cures more slowly than the first epoxy resin composition.

It has now been found that, by the use of this process, one can easily apply a corrosion-resistant coating to rigid, hollow articles which are wet or even totally submerged under water, as well as to the dry surfaces of a rigid, hollow article. The application is particularly efficient when applied to surfaces while they are under water or to a conduit or container without having to interrupt the flow of a fluid through a conduit or removing the contents of a container. The coatings have excellent adhesion to both metal and non-metal surfaces even when they are under water. The coatings when they are cured also demonstrate outstanding resistance to corrosion by fresh water, sailing water, moist air and the like. In addition, the coatings are very hard and tough and have a high heat resistance, sufficient elasticity, a low shrinkage factor, high specific adhesion, as well as providing resistance to moisture and solvents and the like.

It is not possible to practice this invention utilizing only epoxy resins which cure rapidly and have a very short pot life. These resins are too brittle for most applications. In addition, there is also a very low chemical resistance and a considerably high rate of shrinkage. In addition, epoxy resins which cure rapidly have not heretofore been employed in sealing leaks on pipes, containers or other solid hollow articles up to now because these epoxy resins do not maintain their shape under prolonged stress, there is distortion when they are subjected to hot and/or cold temperatures and, in addition, their adhesive strength is not high enough in order to provide for permanent and durable repairs. Thus, it is not possible to employ epoxy resin compositions which cure rapidly, for the repair of rigid, hollow articles, such as pipes and other conduits, containers, etc., having a local fluid permeable discontinuity therein.

On the other hand, epoxy resins which cure over a relatively longer period of time (i.e., at least about 1 hour) have been utilized for repairing leaks in various types of rigid, hollow articles such as containers and conduits. Although these resins do possess satisfactory properties rendering them useful for patch work (e.g., good chemical resistance, high compression strength, low rate of shrinkage, not brittle, good heat resistance, satisfactory coefficient of thermal expansion, and good adhesive properties), there remains one serious drawback in their use. These epoxy resins cannot be utilized in the repair of rigid, hollow articles such as conduits and containers unless the fluid within the article is initially removed. Thus, these epoxy resins are not satisfactory for the sealing of a local fluid permeable discontinuity wherein the fluid is subjected to a comparatively high pressure which usually results from either the flow of a fluid through the conduit and/or the pressure of a fluid within a container which is exerted against the wall of the container.

Totally unexpected results have been achieved when the novel process of this invention is utilized, however. The initial coating of an epoxide resin which has a rapid curing rate, is sufficient to stop the flow of a fluid through the local fluid permeable discontinuity due to its great over-pressure. The application of a second coating or layer of a curing epoxy resin, which cures over a longer period of time, over the initial layer, enables the combined two layer coating to exhibit an unexpected combination of properties. These properties include: good chemical resistance, high heat resistance, high compression strength, sufficient elasticity, low shrinkage factor, good adhesive properties as well as permitting one to repair a leak on a rigid, hollow article having a local fluid permeable discontinuity without the necessity of removing the fluid from within.

The polyepoxides used in the process of this invention comprise those organic materials possessing at least one 1,2-epoxy groups, i.e.,

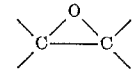

The compounds may be saturated or unsaturated aliphatic, cycloaliphatic, aromatic or heterocyclic and may contain substituents such as halogen atoms, hydroxyl groups, ether radicals, and the like. They may be monomeric or polymeric.

Generally, such epoxide resins comprise a polyether derivative of a polyhydric organic compound, said derivative containing 1,2-epoxy groups and said compound being selected from the group consisting of polyhydric alcohols and phenols containing at least two phenolic hydroxy groups.

Among the polyhydric phenols which may be used in preparing such glyicidyl polyethers are the mono-nuclear phenols such as resorcinol, catechol, hydroquinone, etc. and the polynuclear phenols such as bis(4-hydroxyphenyl)-2,2-propane, 4,4'-dihydroxybenzophenone, bis(4-hydroxyphenyl) - 1,1 - ethane, bis(4-hydroxyphenyl)-1,1-isobutane, bis(4-hydroxyphenyl)-2,2-butane, bis(4-hydroxy-2-methylphenyl) - 2,2 - propane, bis(4-hydroxy-2-tertiary butylphenyl)-2,2-propane, bis(4-hydroxy-2,5-dichlorophenyl)-2,2-propane, 4,4'-dihydroxybisphenyl, 4,4'-dihydroxypentachlorobisphenyl, bis(2-hydroxynapthyl)-methane, 1,5-dihydroxynaphthalene, phloroglucinol, 1,4-dihydroxynaphthalene, 1,4 - bis(4-hydroxyphenyl) cyclohexane, etc., as well as other complex polyhydric phenols, such as pyrogallol, phloroglucinol and novalac resins from the condensation of a phenol with an aldehyde in the presence of an acidic condensation catalyst. For the nature and preparation of novalac resins, see the book by T.S. Carswell, Phenylplast, 1947, page 29, et. seq.

There can also be used 1,2-epoxy containing ethers of aliphatic polyhydric alcohols, such as polyglycidyl ethers thereof, as for example, the diglycidyl ethers of ethylene glycol, propylene glycol, trimethylene glycol, butylene glycol, diethylene glycol, 4,4'-dihydroxydicyclohexyl triethylene glycol, glycerol, dipropylene glycol, and the like, as well as ethers containing more than two glycidyl groups such as the glycidyl polyethers, glycerol, mannitol, sorbitol, polyalkyl alcohol, polyvinyl alcohol, and the like.

These epoxide resins, or glycidyl polyethers as they are frequently called may be prepared by reacting predetermined amounts of at least one polyhydric compound and one epihalohydrin in an alkaline medium.

While it is preferred to use epichlorohydrin as the epihalohydrin in the preparation of the epoxide starting materials of the present invention, other epihalohydrins such as epibromohydrin may be used advantageously.

In the preparation of the epoxide resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide may be employed; although for economic reasons, sodium hydroxide is obviously preferred.

The product of the above-described reaction instead of being a single simple compound is generally a complex mixture of glycidyl polyethers, but the principal product may be represented by the formula:

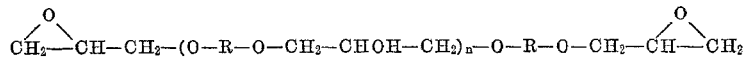

where $n$ is an integer of a series 0, 1, 2, 3 . . . and R represents a divalent hydrocarbon radical of a polyhydric compound and, preferably, a dihydric phenol. While for any single molecule $n$ is an integer though the fact that the obtained polyether is a mixture of compounds causes the determined value for $n$, e.g., from molecular weight measurements, to be an average which is not necessarily a whole number.

Epoxies are disclosed in various places in the art; among the references which may be mentioned are U.S. Pat. Nos. 2,324,483; 2,444,333; 2,494,295; 2,500,600; 2,503,726; 2,511,913; 2,518,056; 2,558,949; 2,579,698; 2,582,985; 2,592,560; 2,615,007; 2,615,008; and 2,633,458.

Many of the epoxide resins prepared by the above reaction are sold under trade names as, for example, Epon resins by Shell Chemical Corporation or ERL resins by Union Carbide Chemicals Company. Data on several types are given in Table I below:

TABLE I

| | Epoxide equivalent weight | Viscosity [1] 25°C.(Gardner-Holdt), poises | M.P.° C., Durran mercury method |
|---|---|---|---|
| Trade name and number: | | | |
| Epon 815 | 175–210 | 5–9 | 2 |
| Epon 828 | 175–210 | 50–150 | 812 |
| ERL–2774 | 185–200 | 105–195 | 2 |
| Epon 834 | 225–290 | | 20–28 |

[1] The viscosities on Epon 815, Epon 828 and ERL–2774 are on pure resin, Epon 834 on 70% weight solution and butyl Carbitol, and all other 40% weight solution and butyl Carbitol.
[2] Liquid.

Preferred polyethers are prepared from bis(4-hydroxyphenyl)-2,2-propane and contain a chain of alternating glyceryl and 2,2-bis(phenylene) propane radicals separated by intervening ethereal oxygen atoms and have a 1,2-epoxy equivalency between 1 and 2, and epoxide equivalent weight of about 170 to about 250. A particularly suitable material for use in the invention is a normally liquid glycidyl polyether of bisphenol-A having an epoxide equivalent weight of about 175 to 200 and a 1,2-epoxy equivalency of about 1.8 to about 1.95.

Another group of epoxide resins that may be used are those which are derived by the reaction of peracetics and unsaturated compounds. A typical member of this class is the epoxide resin derived from butadiene and crotonaldehyde which have undergone the Diels-Alder condensation and the Tishchenko reaction:

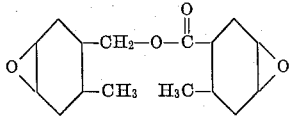

This compound is sold commercially as EP 201.

Still another group of epoxide resins are the polyepoxide polyesters which are prepared by epoxidizing the unsaturated portions of the tetrahydrophthalic residues in the polyester composition. These polyepoxide polyester compositions, as well as their preparation, are described in U.S. Pat. No. 2,847,394.

The term "epoxy equivalency" as employed in this specification, refers to the number of epoxy groups contained in the average molecule of the desired material. The epoxy equivalency is obtained by dividing the average molecular weight of the polyepoxide by the so-called "epoxide equivalent weight." The epoxide equivalent weight is determined by heating one gram sample of the polyepoxide with an excess of pyridinium chloride dissolved in pyridine at the boiling point for twenty minutes. The excess pyridinium chloride is then back-titrated with 0.1 N sodium hydroxide to phenol-phthalein end point. The epoxide value is calculated by considering 1 HCl as an equivalent of one epoxide. This method is used to obtain all epoxide values reported herein.

The hardening of epoxide compositions of this invention may be accomplished by the addition of any of the chemical materials known in the art for curing epoxide resins. Such materials are usually referred to as curing agents but at times are designated as hardeners, activators or catalysts. While some curing agents promote curing by catalytic action; others participate directly in the reaction and are absorbed into the resin chain and are referred to as hardeners. Depending upon the particular agent employed, the curing may be accomplished at room temeprature, with heat produced by exothermic reaction or by the application of external heating in order to start the curing.

Preferably, the procedure of the invention is carried out at first with an epoxy resin to which an initial curing agent has been added, so that the epoxy resin composition cures rapidly and usually between about 1 to about 5 minutes, and preferably, from about 1 to about 3 minutes. Thereafter, a second curing agent is added to an epoxy resin which is to be applied over the hardened first layer as well as the surrounding area and the curing time of the epoxy resin with a second curing agent is from about 1 to 5 hours, and preferably, from about 3 to 4 hours. The two epoxy resins employed may be either the same or different epoxy resins, the only difference in the two compositions residing in the curing rate.

The curing rate of a particular epoxy resin is dependent on any number of factors. For instance, an epoxy ring will differ in reactivity, depending upon whether it is terminal, internal or ring situated. In addition, the temperature of the environment in which reaction takes place, the particular type of curing agent employed, as well as the thickness of the coating being applied.

It is preferable to employ a curing agent that causes the homopolymerization of the epoxy resin which is to be applied as the first layer over the local fluid permeable discontinuity. The curing agents, which are termed "catalysts," produce a rapid cure of the epoxy resin. These curing agents include tertiary amines and, preferably, boron trifluoride-amine complexes. The tertiary amine curing agents contain aliphatic, cycloaliphatic, or aromatic hydrocarbon radicals containing not more than 15 carbon atoms and suitable examples include the trialkylamines, triarylamines, triarylalkylamines and tricycloalkylamines. Particularly useful tertiary amines include tributylamine, trioctylamine, tridodecylamine, methyldibenzylamine and tribenzylamine. Suitable boron trifluoride-amine complexes include the complexes of boron trifluoride with primary, secondary and tertiary amines. The preferred boron trifluoride complexes include the boron trifluoride-methylamine complex, the boron trifluoride-dimethylamine complex, the boron trifluoride ethylamine complex, the boron-trifluoride-triethylamine complex, as well as the boron trifluoride complexes with amylamine, decylamine, monoethanolamine, diethanolamine, triethanolamine, and hexanolamine.

Suitable examples of the curing agents which may be employed in the second epoxy resin layer which is to be placed over the first layer include those organic nitrogen compounds which cause the addition polymerization of the epoxy resin molecule. These curing agents include various amines such as aliphatic and aromatic primary and secondary amines, aliphatic and aromatic polyamines, polyfunctional carboxylic acid amides, and polysulfides. A preferred embodiment of this invention resides in the use of a mixture of aromatic polyamides. The use of these curing agents which cause the homopolymerization of the epoxide results in a cure which takes place over a period of time which is greater than the curing period of the first epoxy resin layer.

Suitable examples of aliphatic and aromatic primary and secondary amines include diethylamine, mono- and dibutylamine, dibenzylamine, etc. Suitable examples of polyamines which may be employed include m-phenylene diamine, p-phenylene diamine, 4,4'-methylene dianylene, m-xylene diamine, 4,4'-diamino diphenyl sulfone, ethylene diamine, N,N-diethylene diamine, diethylene triamine, triethylene tetramine, tetraethylene pentamine, pentaethylene diamine, etc. The polyfunctional carboxylic acid amides include acetamide, adipamide, benzamide, deacetamide of hexamethylene diamine, monoamides of the type described in U.S. Pat. No. 2,760,944. Preferred mixtures of aromatic polyamines include 4,4'-methylene dianlyene and diaminodiphenyl sulfone; and m-phenylene diamine and diaminodiphenyl sulfone.

Effective concentrations of curing agents in the epoxy resin compositions of this invention vary in wide ranges depending upon the particular epoxide and curing agent selected and the desired rate of cure. Where a rapid cure is desired, homopolymerization of the epoxy resin can be effected where the curing agent is present in an amount such that there is one epoxy group for each active hydrogen of the amine employed. Where it is desirable that the epoxy resin composition cure more slowly, as in the case of the second layer, the addition polymerization can be achieved by using the appropriate curing agents in an amount of from about 1 to about 20 parts per 100 parts by weight of the epoxide and more preferably, from about 5 to about 20 parts per 100 parts by weight of the epoxide.

A variety of inert solid additives may be employed as optional ingredients in the process of this invention in order to improve the properties of the epoxide resins. For example, reinforcements such as fibers in the form of a cloth, mat, or chopped strands or staple may be employed and form a continuous framework which buttresses the resin. The fibers may be mineral, vegetable, or synthetic with the only requirement being that they possess a high tenacity. A particularly useful reinforcement additive is glass fiber. Glass fiber confers increased tensile, compressive, flexural and impact strength, improves heat resistance, and reduces shrinkage and thermal expansion of the epoxide resin. Other reinforcements which are particularly useful are particles of solid resins such as particles of nylon, rayon, Dacron, etc.

Other materials may also be included in the composition of the present invention. Materials which are particularly desirable for use, especially when coatings are to be applied while the surface is immersed under water are those which in part impart thixotropic properties to the composition. Examples of these include, among others, silicones, silicates, non-fibrous asbestos, silica aerogels, montmorillonite clay minerals such as bentonite and the like. These materials are preferably finely divided and preferably have particles of up to fifty microns in size. The thixotropic agents are employed in order to clot a liquid epoxy resin so that it will not drain from an inclined or even a vertical surface. The finely divided particles form webs which immobilize the liquid, although stirring usually breaks up the mass so that the composition can be poured or brushed. Particularly preferred materials to be utilized with this invention include the finely divided colloidal materials which swell in the presence of water, and especially those having a heat of interaction with the polyepoxide of less 300 ergs per square centimeter. These thixotropic materials are preferably utilized in amounts of up to about 10% by weight of the combined mixture and still more preferably in amounts varying from about 0.1% to 5% by weight.

Other materials which may also be added include inert fillers. These fillers are incorporated into an epoxy resin in order to reduce the resin content. The ideal filler is employed to improve the properties of the composition which the pure epoxy is lacking, without causing serious impairment of the resin's more desirable characteristics. The use of fillers of the epoxy resins of this invention, are particularly useful since the filler usually reduces the shrinkage of the resin during cure as well as adjusting the thermal coefficient of expansion of the resin masses. The addition of a filler also produces an increase in viscosity. This is desirable since it reduces the tendency of the epoxy resin to flow and drain off inclined or vertical surfaces. Suitable fillers include both mineral and metallic fillers. Examples include sand, crushed shells, rocks, aluminum powder, steel powder, iron particles, quartz powder, titanium dioxide, asbestos, silica, calcium carbonate, graphite, black iron oxide, silicon dioxide, diatomaceous earth and the like. The relative proportion of filler employed in the new process of this invention, may vary from about 20 to about 70% by weight for the base or first layer and from about 30 to about 85% and preferably 67% by weight for the covering or second layer. In each instance, the percent by weight is based upon the total weight of the epoxy resin and curing agent employed.

In order to reduce the viscosity of the epoxy resin, it is also possible to add a solvent or thinner. Suitable solvents include an aromatic hydrocarbon or mixtures of aromatic hydrocarbons, e.g., toluene, xylene or solvent naphthas, for example, it is also possible to employ esters, such as ethyl acetate, butyl acetate, Cellosolve acetate (ethylene glycol monoacetate), methyl Cellosolve acetate (acetate ethylene glycol monomethyl ether), etc.

ILLUSTRATIVE EXAMPLES

Example I

This example illustrates the applicability of a novel procedure of this invention to the sealing of a leak of about 5 mm. x 40 mm. in size which is in the shape of a crack in a grey cast iron pipe. The inside diameter of the pipe is 150 mm. whereas the outside diameter is approximately 170 mm. The crack runs at a diagonal to the pipe longitudinal axis.

Initially a rotating wire brush was employed to clean the surface around the leak in the empty pipe until right metal was obtained. Thereafter, this surface was treated with an organic solvent in order to remove greasy and/or oily residues. Then, the composition was applied to cover the leak. This initial composition was formed by mixing composition A which was prepared by mixing the following components together in the proportions shown:

| | Parts by wt. |
|---|---|
| EPON 828 (an epoxy resin consisting of 4,4'-dioxydiphenylpropane and epichlorohydrin), with a viscosity at 25° C. of 100–150 poise and the epoxide equivalent of 182–194 | 70 |
| Quartz powder (mineral filler) | 30 |

Composition A was then mixed together with composition B in substantially equal parts by volume. Composition B comprises the following ingredients in the proportions shown:

| | Parts by wt. |
|---|---|
| Accelerated BF$_3$-amine complex dissolved in fluid plasticizers | 60 |
| Boron trifluoride | 02 |
| Triethylene glycol | 86 |
| Phenol | 12 |
| Quartz powder | 36 |
| Silicon dioxide | 4 |

The curing of the initial composition took approximately 120 seconds. Thereafter, a covering layer 2 was applied over the initial coating composition. The second composition employed was formed by mixing a composition which was prepared by mixing the following components together in the proportion shown:

| | Parts by wt. |
|---|---|
| Same epoxy resin as employed in composition A, above | 20 |
| A powder of Diatomaceous earth as a mineral filler | 20 |
| Steel powder filler | 20 |
| Aluminum powder filler | 10 |

Together with a composition D which was prepared by mixing the following ingredients together in the proportions shown:

| | Percent by wt. |
|---|---|
| A mixture of aromatic polyamines | 15 |
| Methylene dianylene | 60 |
| m-Phenylene diamine | 40 |
| Diatomaceous earth filler | 12 |
| Steel powder filler | 6.25 |
| Aluminum powder filler | 6.25 |

Covering layer 2 was applied approximately from about 2 to about 5 mm. thick over a surface that overlapped the outer edge of covering layer 1 by approximately 5 to 10 mm. The second coating composition took approximately from about 3 to 4 hours to cure.

The pipe is fully ready for use once the second coating composition has fully cured. It is not necessary to wait for the expiration of the stated period of time, however, if no more than a brief shutdown of operation is allowable for important elements of line. The full internal pressure of the repaired line may be restored as soon as the first covering layer has been cured. An example of this sort is more fully described in Example II below:

Example II

Here a leak in an asbestos-cement pipe (inside diameter 150 mm., wall thickness 17 mm.), shaped like a crack approximately 3 mm. wide and 110 mm. long was sealed by the procedure of the invention at an operating temperature of 19° C. Preliminary treatment of the surface consisted of washing the region of the crack with 10% hydrochloric acid followed by rinsing with water and drying. During the repair work, the pipe was under a pressure of about 470 mm. water column and had city gas flowing through it. Converging layers 1 and 2 were applied with an interval of about 150 seconds between them. The composition of the two covering layers was the same as employed in Example I. This example differs from Example I, however, in the presence of internal overpressure during the repair job, due to the presence of the flowing gas. A fiber glass fabric was therefore employed when applying the covering layer 1. Where such a low overpressure existed, this fabric was employed in order to provide better support for the covering layer 1 while it was being cured under pressure. The fiber glass-reinforced covering layer 1 overlapped the crack by about 5 mm., on all sides, while the covering layer 2 was applied so as to overlap the layer 1 by approximately 10 to 15 mm. on all sides. The layers were each about 3 to 4 mm. thick.

Example III

This example illustrates the sealing of a leak of a comparatively larger cross-sectional area in a grey cast-iron pipe approximately 500 mm. in diameter with the wall thickness of approximately 20 mm. The leak to be sealed resulted from a blow that broke out a piece of cast-iron approximately 60 mm. x 80 mm. in size. The operating temperature was 17° C. Pretreatment was the same as in Example I.

After the surface had been cleaned, a fiber glass fabric in the shape of two strips, each 100 mm. wide and 170 mm. long was coated with the epoxy resin mass mixed with a curing agent and applied to the leak and the surrounding area. After a curing time of approximately 120 to 180 seconds, the covering layer 2 was applied over covering layer 1 in the thickness of approximately 3 to 4 mm., overlapping the covering layer by some 20 mm. on all sides. The composition of the covering layer 1 and covering layer 2 was the same as in Example I. It took approximately 1 to 2 hours to cure the covering layer 2. It was possible, however, to place the comparatively big hole prepared in this manner under pressure in no more than 15 minutes, for the covering layer 1, reinforced as it was with fiber glass fabric, was able to handle the pressure stress by itself after a few minutes had elapsed and until the covering layer 2 had been cured.

The foregoing examples clearly demonstrate the advantages of the procedure of the present invention, which permits, for the first time, the sealing of a leak without any interruption or with only a relatively short interruption in operation. Leaks sealed in this manner are also not only temporarily repaired, but are completely capable of withstanding the stresses to which the repaired container or conduits are normally exposed over long periods of time and use. In addition, leaks repaired in this manner also exhibit highly satisfactory chemical resistance, high compression strength, a low rate of shrinkage, good heat resistance, satisfactory thermal coefficient of expansion as well as satisfactory adhesive properties.

The process of this invention may be employed for the coating and/or repair of any type of surface. These surfaces include among others, wood, cement, plaster, metal, glass and the like. The novel process of the invention is particularly suited for use in treating metal surfaces, such as, for example, copper, aluminum, brass and iron surfaces. The surfaces may be in any type of structure, such as, for example, pipes, boats, piling, reaction vessels, structural members of oil well drilling platforms, well jackets, collection platforms, boat holes, heat exchange tubes, and the like.

The compositions employed in the novel process of this invention may be prepared, as indicated by the foregoing examples, or simply by admixing several components. In general, the separate components may be admixed in any desired order and, if desired, combinations of two or more of the components (if there are more than two) may be prepared initially in any remaining components added subsequently. However, it is usually desirable to add the curing agent just prior to use, particularly where the curing agent renders the composition readily curable at or near room temperatures.

It will be appreciated by those skilled in the art that the choice and amount of the various components of the composition of the invention will be subject to adjustment and correlation and will also depend upon the type and amount of epoxide resin employed, curing agent employed, as well as any other optional ingredients that may be present in the compositions. These factors in turn are subject to adjustment and correlation with the procedure for preparing the complete compositions, e.g., order of mixing, etc.

Having now discussed in considerable detail, illustrative and preferred embodiments of the invention, it should be apparent that the objects set forth at the outset of this specification have been satisfied. Accordingly,

What is claimed is:

1. A method of repairing a rigid, hollow article having a local fluid permeable discontinuity therein, comprising (a) spreading out over said discontinuity a first epoxide resin coating composition comprising an epoxy resin having an epoxide equivalent of from about 170 to about 250, and a curing agent, said epoxide mixture being capable of curing rapidly; (b) then applying on the top of said first coating a second epoxy resin composition comprising an epoxy resin having an epoxide equivalent of from about 170 to about 250, and a curing agent, said second epoxy resin composition curing more slowly than said first epoxy resin composition; said first composition curing in about 1 to about 5 minutes and said second composition curing in about 1 to about 5 hours.

2. A method according to claim 1, wherein said first and second epoxy resin compositions further comprises, as an additional ingredient therefor, an inert filler.

3. A method according to claim 2, wherein the amount of filler in said first epoxy resin composition is approximately 20 to 70 percent by weight of the total composition and the amount of filler in said second epoxy resin composition is approximately 30 to 80 percent by weight of the total composition.

4. A method according to claim 1, wherein the curing agent employed in said first epoxy resin composition is a catalyst.

5. A method according to claim 4, wherein said catalyst is a tertiary amine-boron trifluoride complex.

6. A method according to claim 1, wherein the curing agent employed in said second epoxy resin composition is a hardener.

7. A method according to claim 6, wherein said hardener is an aromatic polyamine.

8. A method according to claim 1, wherein said first epoxy resin composition comprises 70 parts by weight of an epoxy resin consisting of 4,4'-dioxydiphenyldipropane and epichlorohydrin, 60 parts by weight of a boron trifluorideamine complex, 2 parts by weight of boron trifluoride, 86 parts by weight of triethylene glycol, 12 parts by weight phenol and 70 parts by weight of a mineral filler, said epoxy resin having an epoxide equivalent of from about 182–194 and a viscosity of from about 100–150 poise at 25° C.

9. A method according to claim 8, wherein said second epoxy resin composition comprises 20 parts by weight of an epoxy resin consisting of 4,4'-dioxydiphenyldipropane and epichlorohydrin, 15 parts by weight of a mixture of aromatic polyamines and 60 parts by weight of a mixture of an inert filler, said epoxy resin having an epoxide equivalent of from about 182–194 and a viscosity of from about 100–150 poise at 25° C.

10. A method according to claim 1, wherein said first composition cures in about 1 to 3 minutes and said second composition cures in about 3 to 4 hours.

References Cited

UNITED STATES PATENTS

| 2,943,953 | 7/1960 | Daniel | 117—2 |
| 3,159,499 | 12/1964 | Jorda | 117—2 |
| 3,450,295 | 6/1969 | Weber, Jr. | 117—75X |

FOREIGN PATENTS

| 687,145 | 2/1953 | Great Britain | 117—2 |

ALFRED L. LEAVITT, Primary Examiner

A. GRIMALDI, Assistant Examiner

U.S. Cl. X.R.

117—75